(12) United States Patent
Hung

(10) Patent No.: US 7,338,022 B2
(45) Date of Patent: Mar. 4, 2008

(54) SUPPORT APPARATUS FOR SUSPENDING A MONITOR

(76) Inventor: Chin-Jui Hung, No. 11-2, Wu-Nan Rd., Wu-Chi Chen, Taichung Hsien (TW)

( * ) Notice: Subject to any disclaimer, the term of this patent is extended or adjusted under 35 U.S.C. 154(b) by 0 days.

(21) Appl. No.: 11/498,761

(22) Filed: Aug. 4, 2006

(65) Prior Publication Data

US 2008/0029670 A1    Feb. 7, 2008

(51) Int. Cl.
*E04G 3/00* (2006.01)

(52) U.S. Cl. .............. 248/278.1; 248/281.11; 248/922

(58) Field of Classification Search ............ 248/278.1, 248/279.1, 281.11, 920, 921, 922; 361/681
See application file for complete search history.

(56) References Cited

U.S. PATENT DOCUMENTS

| | | | |
|---|---|---|---|
| 6,012,693 A * | 1/2000 | Voeller et al. | 248/280.11 |
| 6,983,917 B2 * | 1/2006 | Oddsen, Jr. | 248/274.1 |
| 7,207,537 B2 * | 4/2007 | Hung | 248/284.1 |
| 2003/0146359 A1 * | 8/2003 | Oddsen, Jr. | 248/278.1 |
| 2004/0222344 A1 * | 11/2004 | Oddsen, Jr. | 248/278.1 |
| 2006/0263082 A1 * | 11/2006 | Brown | 396/421 |
| 2007/0001076 A1 * | 1/2007 | Asamarai et al. | 248/281.11 |

* cited by examiner

*Primary Examiner*—Ramon O Ramirez
(74) *Attorney, Agent, or Firm*—Hershkovitz & Associates, LLC; Abe Hershkovitz

(57) ABSTRACT

A support apparatus for suspending a monitor with a back has a mounting seat, a support arm assembly, an extending arm and a mounting device. The support arm assembly is mounted on the mounting seat and has a proximal bracket, a positioning device, a upper arm, a lower arm, a loading element and a distal bracket. The extending arm is connected to the distal bracket. The connector is connected to the extending arm, connects to the back of a monitor and has a mounting assembly and an adjusting assembly. The mounting assembly is connected to the extending arm and has a connector and an axial connector. The adjusting assembly is connected to the mounting assembly and has a adjusting device and a connecting seat.

10 Claims, 11 Drawing Sheets

SUPPORT APPARATUS FOR SUSPENDING A MONITOR

BACKGROUND OF THE INVENTION

1. Field of the Invention

The present invention relates to a support apparatus, and more particularly relates to a support apparatus that a monitor to be adjusted smoothly and easily.

2. Description of Related Art

A conventional support apparatus for a monitor having a back and a weight has a mounting seat, a pivotal seat, a support arm and a mounting device.

The mounting seat is mounted securely on a table or a wall.

The pivotal seat is connected pivotally to the mounting seat and has a proximal end and a distal end. The proximal end of the pivotal seat is connected pivotally to the mounting seat.

The support arm is connected to the pivotal seat and has a hydraulic piston. The hydraulic piston is connected to the distal end of the pivotal seat and provides a resistive force to hold the support apparatus in place.

The mounting device is connected to the support arm and to a monitor and has multiple bolts. The bolts extend through the mounting device and screw into the back of the monitor.

However, the conventional support apparatus has the following shortcomings.

1. When the support arm is moved to change the orientation of the monitor, the conventional support apparatus may make a noise because elements of the conventional support apparatus rub against each other.
2. A monitor power cord usually extends from the monitor to an outlet and causes an unsightly appearance of the support apparatus.
3. When a new monitor is to be attached to the conventional support apparatus, the bolts must be removed from the old monitor and be screwed into the new monitor to attach the new monitor to the mounting device. Therefore, attaching the monitor to the mounting device of the conventional support apparatus is inconvenient and time-consuming.
4. Furthermore, loosening the bolts by a screwdriver is inconvenient when the conventional support apparatus is mounted on a wall. Then, the entire support apparatus must be removed from the wall before the monitor can be removed from the mounting device and replaced with a new monitor.

Therefore, the present invention provides a support apparatus for suspending a monitor to mitigate or obviate the aforementioned problems.

SUMMARY OF THE INVENTION

The main objective of the present invention is to provide a support apparatus for suspending a monitor, which can adjust smoothly and quietly and can connect easily to a monitor.

The support apparatus for suspending a monitor with a back has a mounting seat, a support arm assembly, an extending arm and a monitoring device. The support arm assembly is connected to the mounting seat and has a proximal bracket, a positioning device, an upper arm, a lower arm, a loading element and a distal bracket. The extending arm is connected to the distal bracket. The mounting device is connected to the extending arm and to the back of the monitor and has a mounting assembly and an adjusting assembly. The mounting assembly is connected to the extending arm and has a connector and an axial connector. The adjusting assembly is connected to the mounting assembly and has an adjusting device and a connecting seat.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
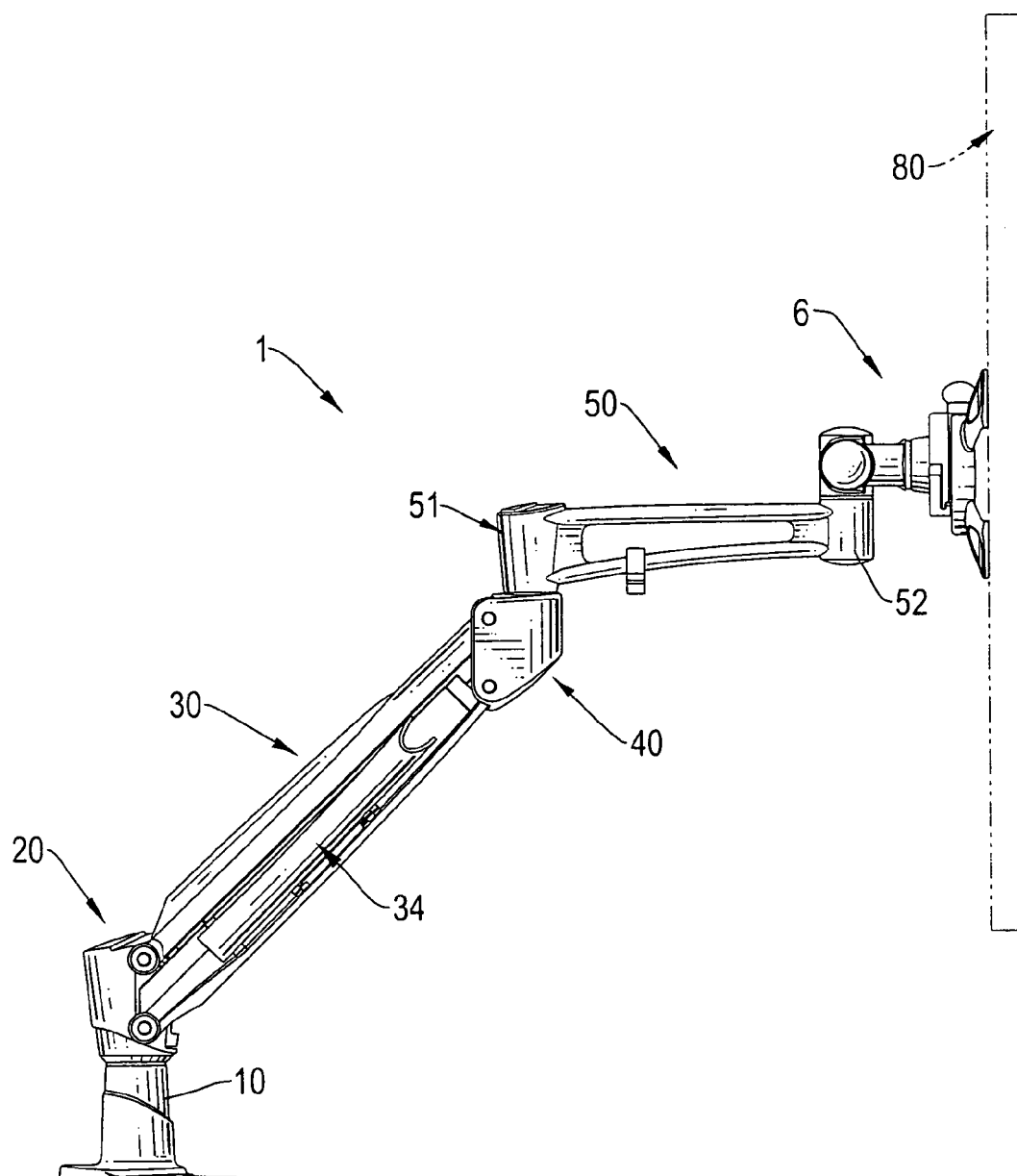
FIG. 1 is a side view of a support apparatus for suspending a monitor in accordance with the present invention.
Figure 2:
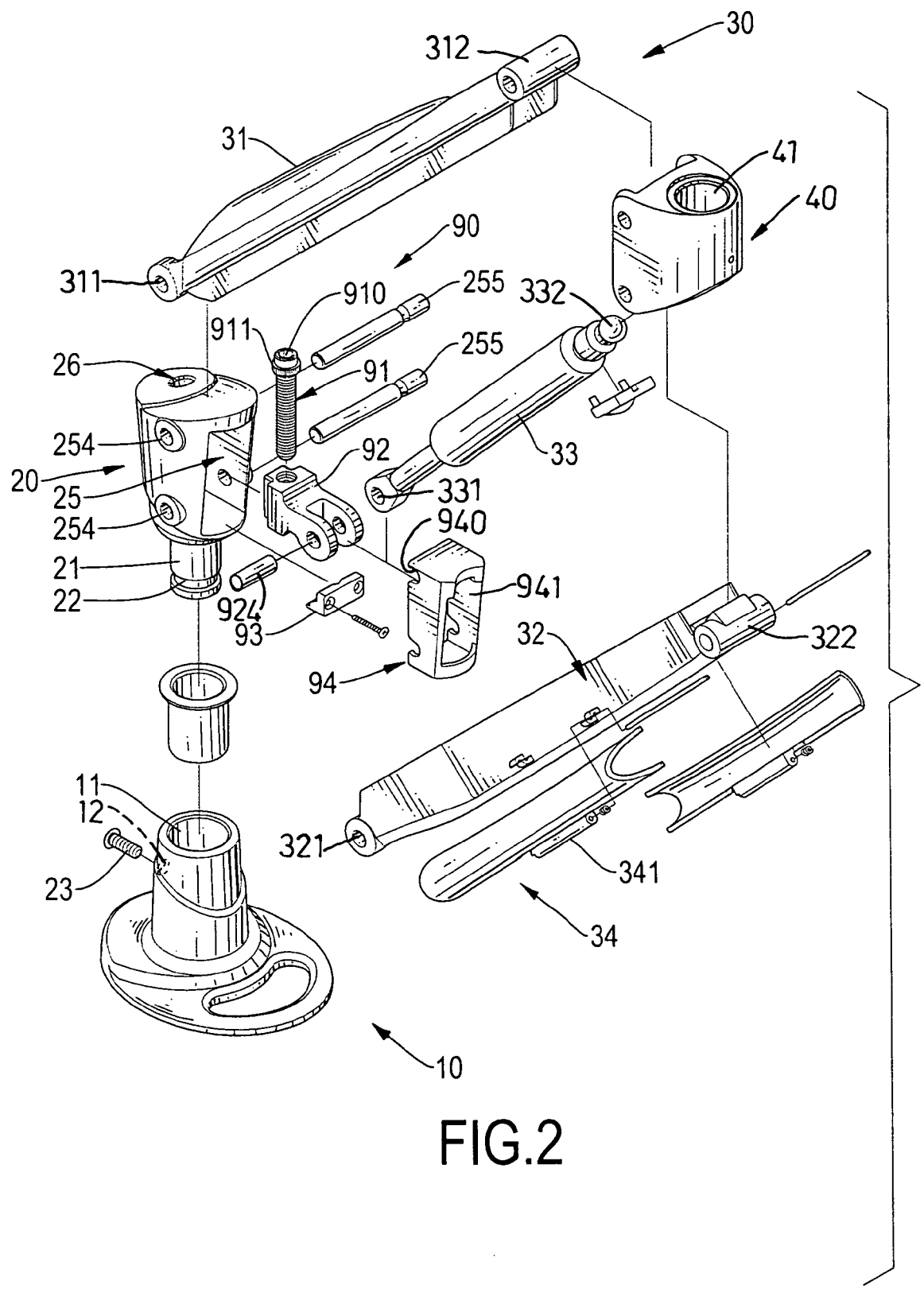
FIG. 2 is an enlarged exploded perspective view of a mounting seat and support arm assembly of the support apparatus in FIG. 1.
Figure 3:
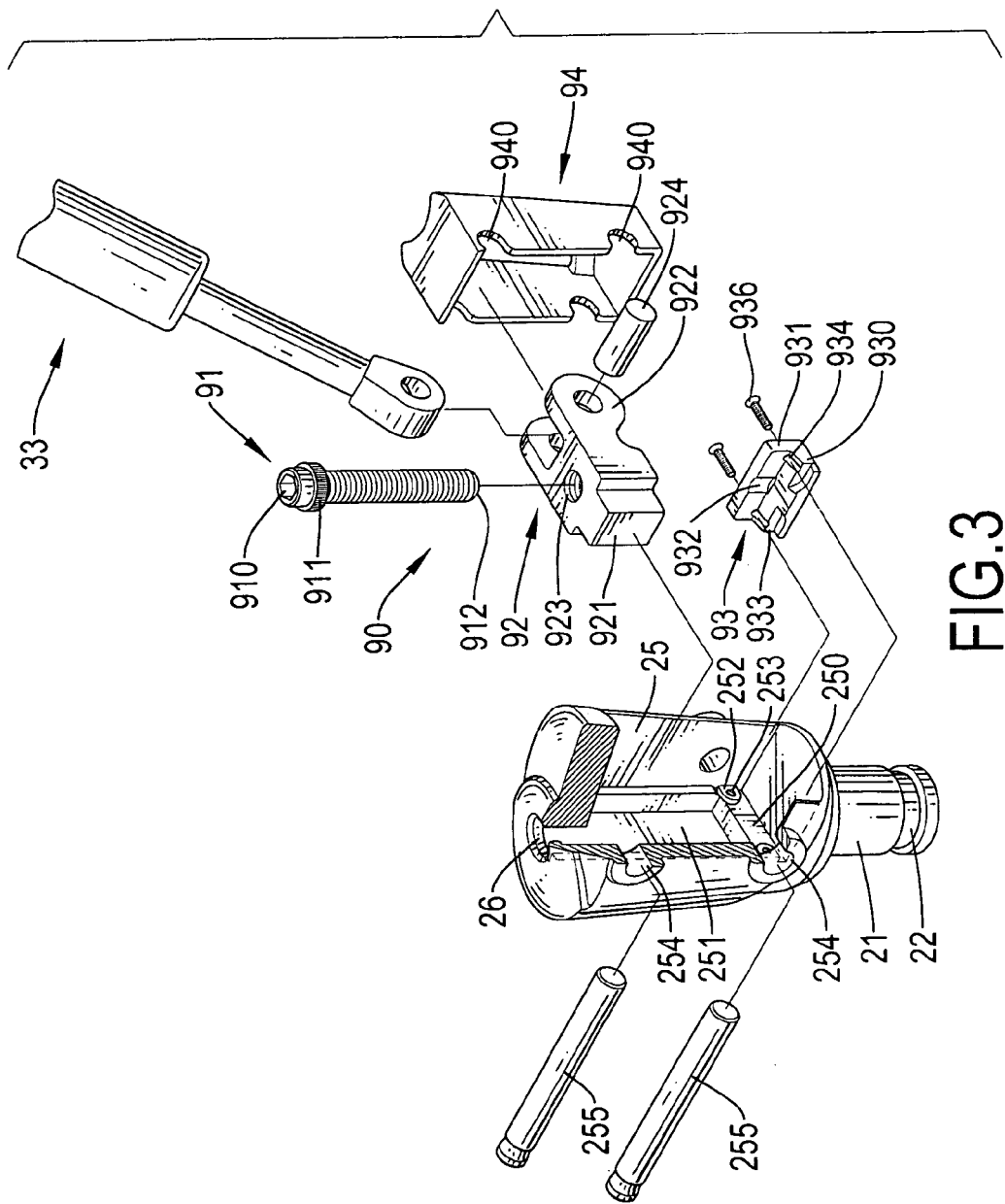
FIG. 3 is an enlarged perspective view in partial section of the support arm assembly in FIG. 2.

With reference to FIGS. 1 to 3 and 7, a support apparatus (1) in accordance with the present invention for suspending a monitor (80) having a back and a power cord comprises a mounting seat (10), a support arm assembly (30), an extending arm (50) and a mounting device (6).

The mounting seat (10) is mounted on a table or on a wall and has a distal end, an optional mounting recess (11) and an optional setscrew hole (12). The mounting recess (11) is defined axially in the distal end of the mounting seat (10). The setscrew hole (12) is formed radial into the mounting seat (10) and communicates with the mounting recess (11).

Figure 4:
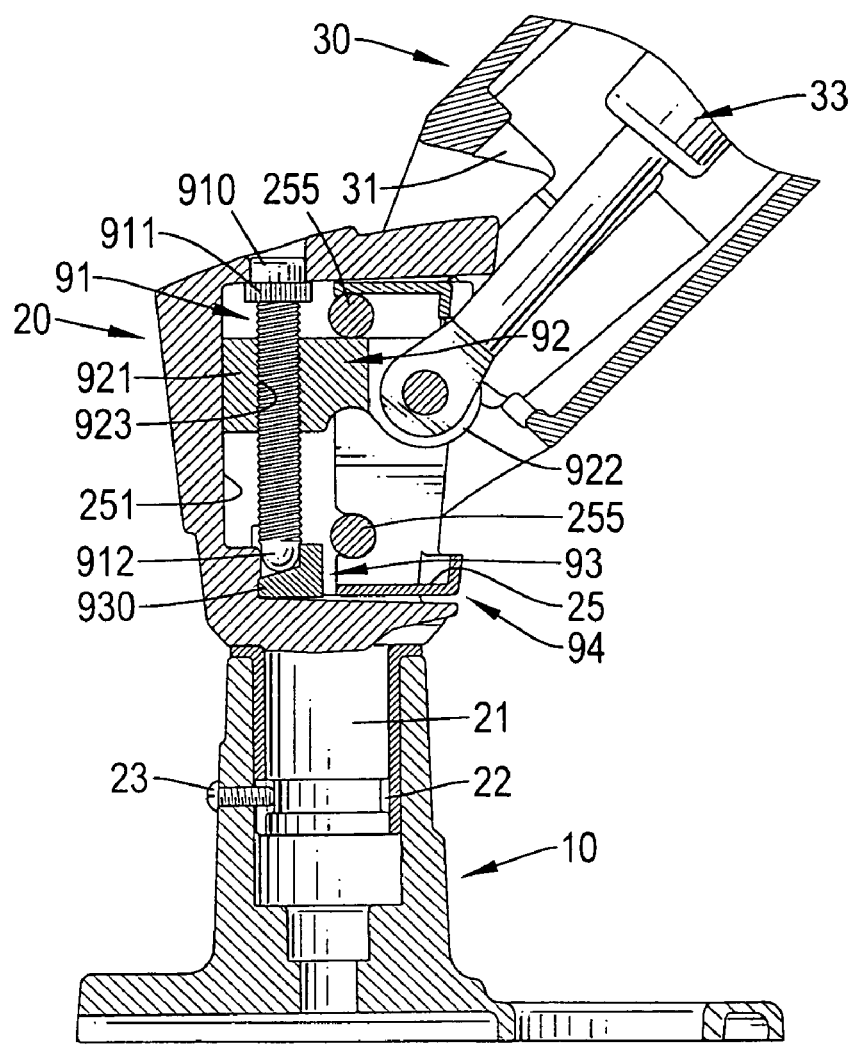
FIG. 4 is an enlarged side view in partial section of the mounting seat and support arm assembly in FIG. 2.

With further reference to FIG. 4, the support arm assembly (30) is connected to the distal end the mounting seat (10) and has a proximal bracket (20), a positioning device (90), an upper arm (31), a lower arm (32), a loading element (33) and a distal bracket (40).

The proximal bracket (20) is connected rotatably to distal end of the mounting seat (10) and has a top, a bottom, an external surface, an optional mounting post (21), an optional setscrew (23), a chamber (25) and a through hole (26).

The mounting post (21) is formed on and protrudes down from the bottom of the proximal bracket (20), is mounted in the mounting recess (11) in the mounting seat (10) and has a distal end, an outer surface and an annular groove (22). The annular groove (22) is formed in the outer surface of the mounting post (21) near the distal end and aligns with the setscrew hole (12) in the mounting seat (10).

The setscrew (23) screws into the setscrew hole (12), extends into the mounting recess (11) and the annular groove (22) and presses against the annular groove (22) to the proximal bracket (20) on the mounting seat (10).

The chamber (25) is defined in the proximal brake (20) and has an opening, an inner surface, a top, a bottom, an inner recess (251), multiple pinholes (254) and two pivots (255).

The inner recess (251) is formed in the inner surface of the chamber (25) and has a shoulder (250). The shoulder (250) is defined adjacent to the bottom and has two ends, two optional protrusions (252) and two optional mounting holes (253). The protrusions (252) are formed respectively on and protrude from the ends of the shoulder (250) toward the opening. The mounting holes (253) are coaxially formed respectively in the protrusions (252).

The pinholes (254) are formed through the external surface of the proximal bracket (20) in aligned pairs and communicate transversely with the chamber (25).

The pivots (255) are mounted respectively in the pinholes (254) in the chamber (25).

The through hole (26) is formed through the top of the proximal bracket (20) near the inner recess (251) and communicates with the chamber (25).

The positioning device (90) is connected to the proximal bracket (20) and has an adjusting bolt (91), a sliding bracket (92), an alignment bracket (93) and an optional cap (94).

The adjusting bolt (91) is mounted through the through hole (26) in the proximal bracket (20), extends into the chamber (25), is treaded and has an outer end, an inner end (912), a head (910) and a mounting flange (911). The inner end (912) presses against the shoulder (250) on the inner recess (251) and may be hemispheric. The head (910) is formed on the outer end and is mounted rotatably in the through hole (26) in the top of the proximal bracket (20). The mounting flange (911) is formed on and protrudes out from the adjusting bolt (91) adjacent to the head (910) and is mounted slidably inside and against the top of the proximal bracket (20) adjacent to the through hole (26) to hold the adjusting bolt (91) inside the chamber (25).

The sliding bracket (92) is driven by the adjusting bolt (91) between the pivots (255) and has a body (921), a threaded hole (923), two parallel ears (922) and a pivot pin (924).

The body (921) of the sliding bracket (92) is mounted slidably in the chamber (25) of the proximal bracket (20) and has a top, a bottom, a rear side and a front side. The rear side of the body (921) slidably abuts the inner recess (251) in the proximal bracket (20).

The threaded hole (923) is formed through the body (921) from the top to the bottom and is screwed onto and driven by the adjusting bolt (91).

The parallel ears (922) are formed on the front side of the body (921) and protrude toward the opening in the chamber (25), and each parallel ear (922) has a pinhole. The pinholes align with each other.

The pivot pin (924) is mounted in the pinholes in the parallel ears (922).

The alignment bracket (93) is mounted against the shoulder (250) in the chamber (25) in the proximal bracket (20), holds the inner end (912) in position and has an optional foot (930), an optional lip (931) and two optional screws (936).

The foot (930) of the alignment bracket (93) is mounted on the bottom of the chamber (25) against the shoulder (250) and has an upper surface, an outer edge and two grooves (933). The grooves (933) are formed in the upper surface of the foot (930) and correspond respectively to and engage the protrusions (252) on the shoulder (250).

The lip (931) is formed on and protrudes up from the upper surface of the foot (930) at the outer edge and has an inner surface, a middle, a curved notch (932) and two through holes (934). The curved notch (932) is formed vertically in inner surface at the middle of the lip (931) and holds the inner end (912) of the adjusting bolt (91) against the shoulder (250). The through holes (934) are formed through the lip (931) and align and communicate respectively with the mounting holes (253) in the protrusions (252).

The screws (936) extend respectively through the through holes (934) in the lip (931) and screw respectively into the mounting holes (253) in the protrusions (252).

The cap (94) is mounted in the chamber (25) through the opening, is connected to the proximal bracket (20) and has two sidewalls, multiple pivot notches (940) and an outer opening (941). Each sidewall has an inner edge. The pivot notches (940) are formed in the inner edges of the sidewalls of the cap (94) and are mounted around the pivots (255) in the chamber (25). The outer opening (941) is formed through the cap (94) and communicates with the open end of the chamber (25).

The upper arm (31) is connected pivotally to the proximal bracket (20) and has a proximal end (311) and a distal end (312). The proximal end (311) of the upper arm (31) is connected pivotally to the proximal bracket (20) by one of the pivots (255) extending through the proximal end (311).

Figure 5:
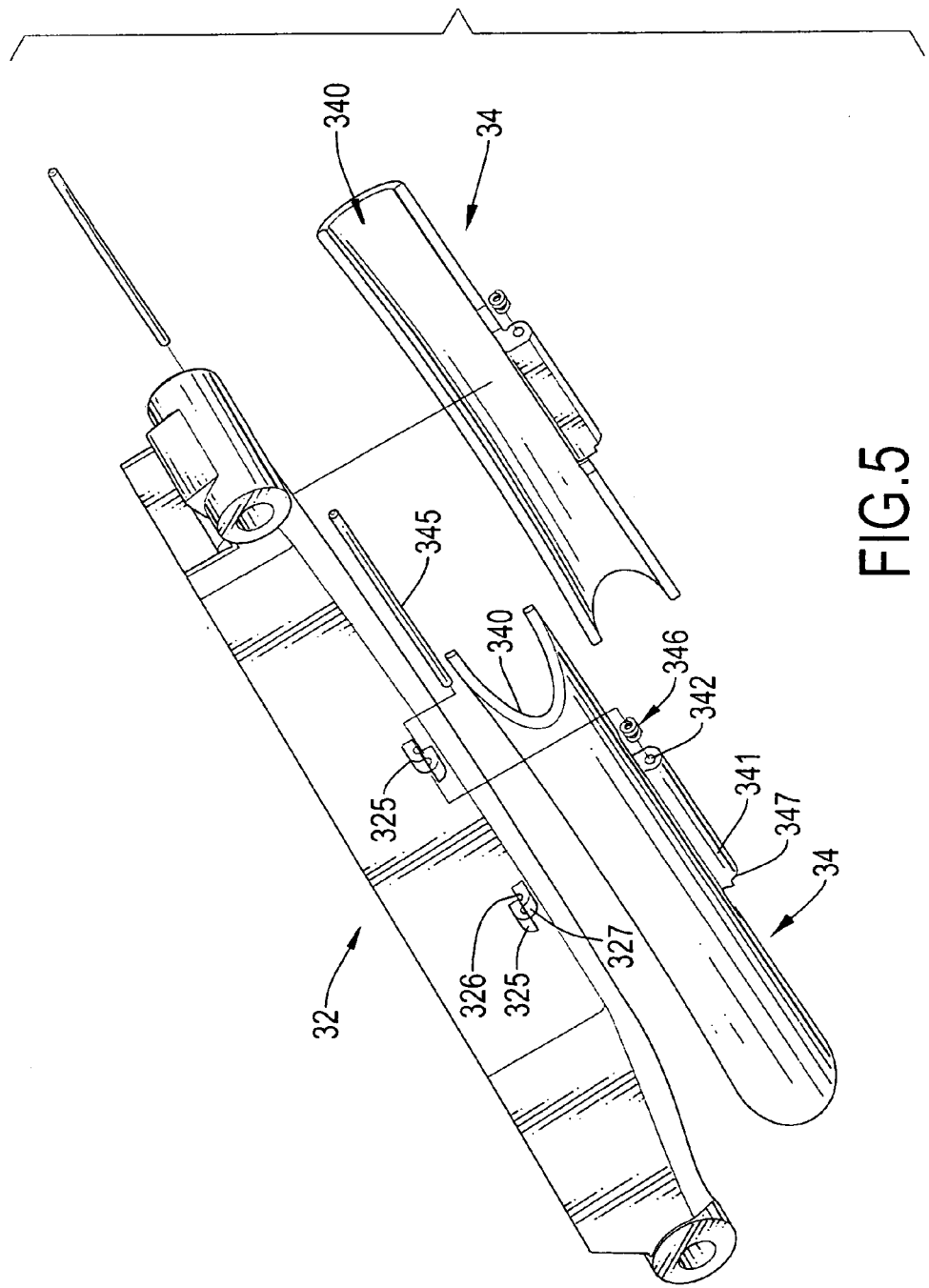
FIG. 5 is an enlarged exploded perspective view of a lower arm in the support arm assembly in FIG. 2.

With further reference to FIG. 5, the lower arm (32) is connected pivotally to the proximal bracket (20) and has two optional sidewalls, a proximal end (321), a front end (322), multiple optional connecting ears (325) and two optional covers (34).

The proximal end (321) of the lower arm (32) is connected pivotally to the proximal bracket (20) by the other pivot (255) extending through the proximal end (321).

The connecting ears (325) are formed in the sidewalls of the lower arm (32), and each connecting ear (325) has a retaining block (327) and a through hole (326). The retaining block (327) protrudes up from the connecting ear (325) opposite to the corresponding sidewall of the lower arm (32). The through hole (326) is formed through the connecting ear (325).

The covers (34) are semicylindrical, hold the power cord of the monitor (80) and are mounted pivotally on the lower arm (32), and each cover (34) has a hinge barrel (341), a pivot pin (345) and a spring (346).

The hinge barrel (341) is formed on the cover (34), is mounted pivotally between the connecting ears (325) and has a lower end, an upper end, a through hole (342) and a notch (347). The through hole (342) is formed coaxially through the hinge barrel (341), communicates with the through holes (326) in the corresponding connecting ears (325). The notch (347) is formed in the lower end of the hinge barrel (341) and selectively engages the retaining block (327) in the corresponding connecting ear (325).

The pivot pins (345) extend respectively through the through holes (342) in the hinge barrels (341), protrude from the upper and lower ends and extend into the through holes (326) in the corresponding connecting ears (325).

The springs (346) are mounted respectively around the pivot pins (345) between the upper ends of the hinge barrels (341) and the corresponding connecting ears (325) and push the hinge barrel (341) to cause the notch (347) to engage the corresponding retaining block (327).

Figure 6:
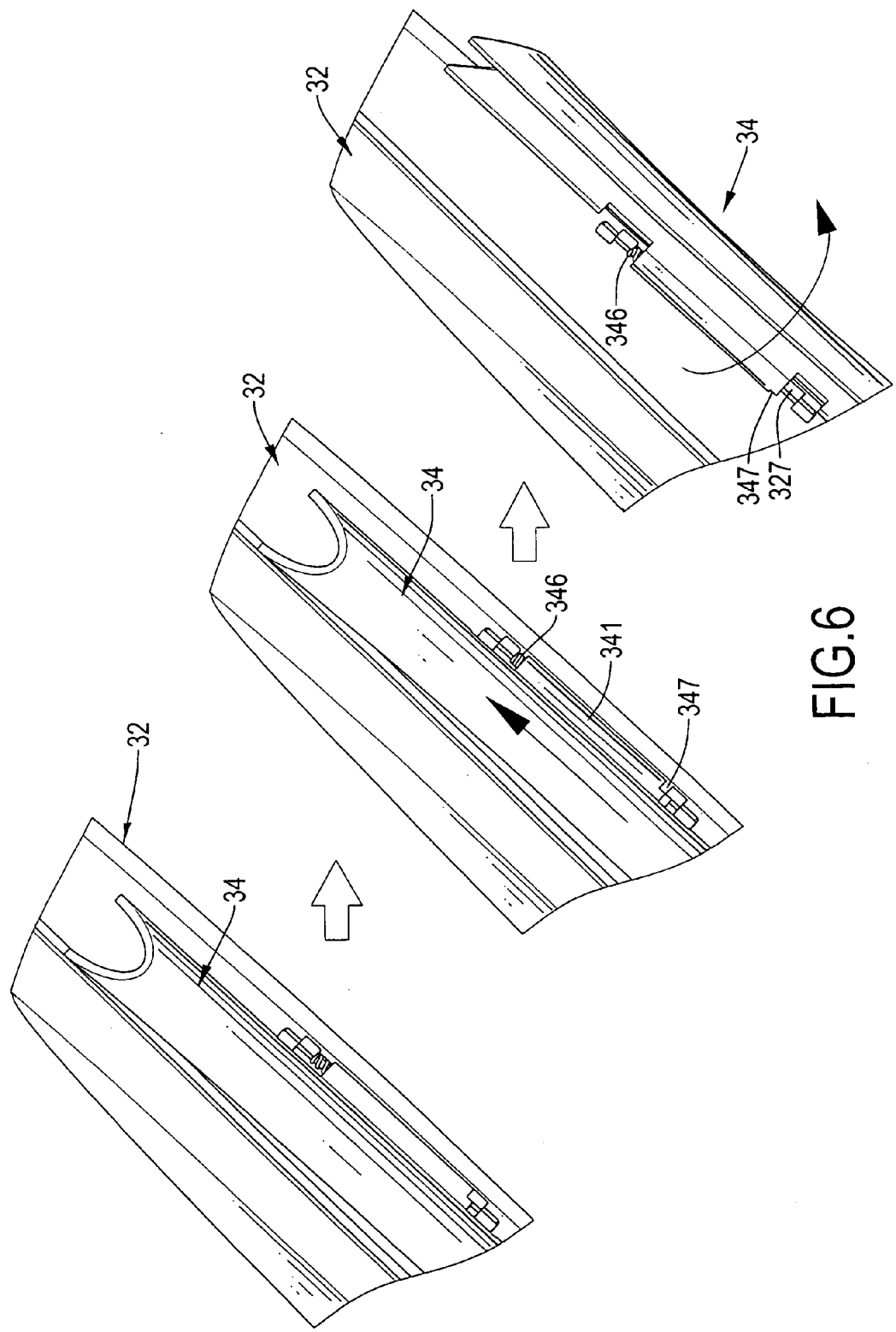
FIG. 6 is an operational side view of the lower arm in FIG. 5.

With further reference to FIG. 6, the cover (34) is opened relative to the lower arm (32) by pushing the cover (34), compressing the spring (346) until the notch (347) disengages from the corresponding retaining block (327) and pivoting the cover (34) away from the lower arm (32).

The loading element (33) is connected to positioning device (90) and has a proximal end (331) and a distal end (332). The proximal end (331) of the loading element (33) is mounted pivotally on the pivot pin (924) between the parallel ears (922) of the sliding bracket (92).

The distal bracket (40) is connected pivotally to the upper arm (31), the lower arm (32) and the loading element (33) and has a mounting recess (41). The distal ends (312, 332) of the upper arm (31), the loading element (33) and the front end (322) of the lower arm (32) are mounted pivotally in the distal bracket (40). The mounting recess (41) is defined vertically in the distal bracket (40).

The extending arm (50) is connected to the distal bracket (40) and has a proximal end (51) and a distal end (52). The proximal end is mounted pivotally in the mounting recess (41) in the distal bracket (40).

Figure 7:
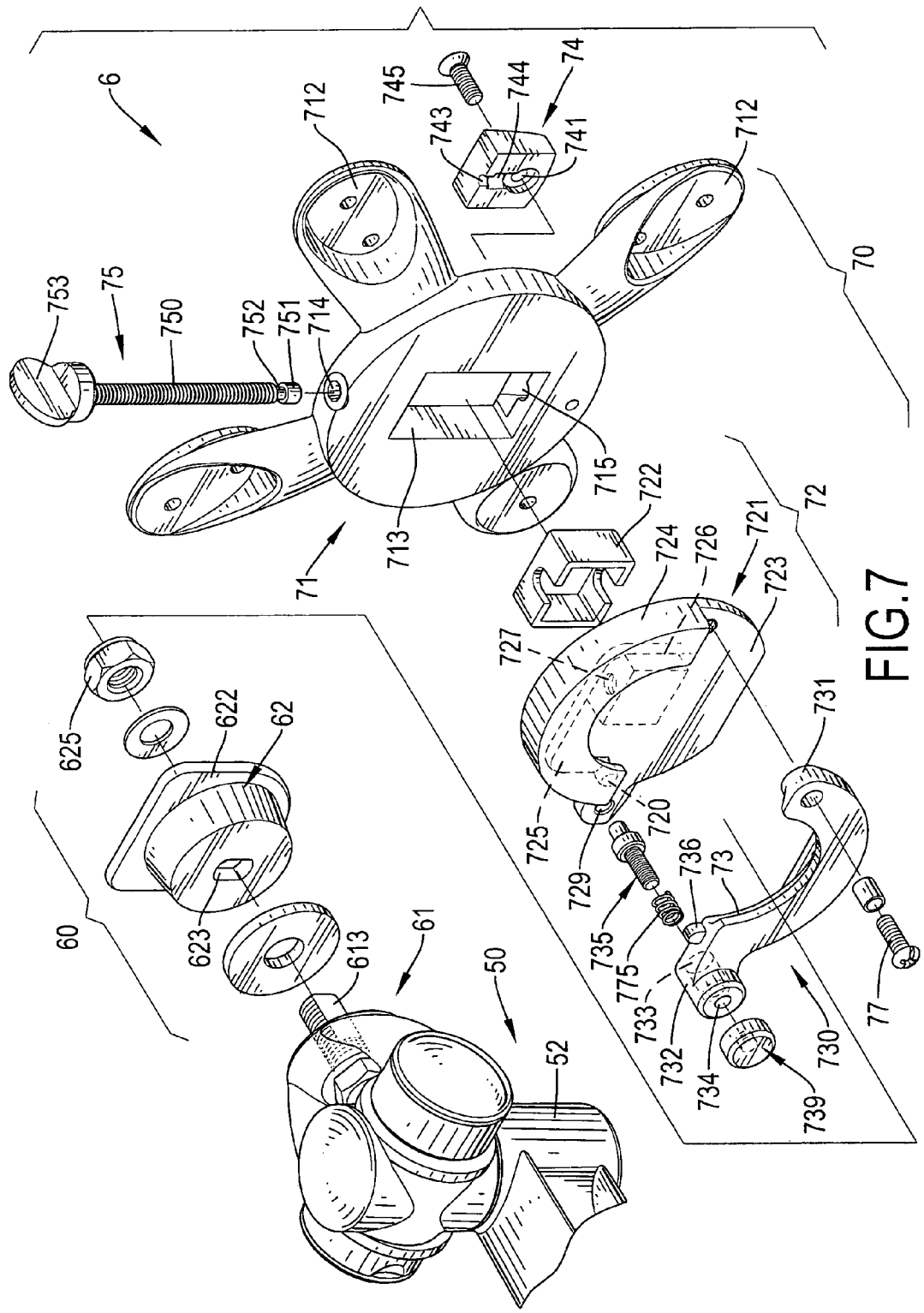
FIG. 7 is an exploded perspective view of a mounting device of the support apparatus in FIG. 1.
Figure 8:
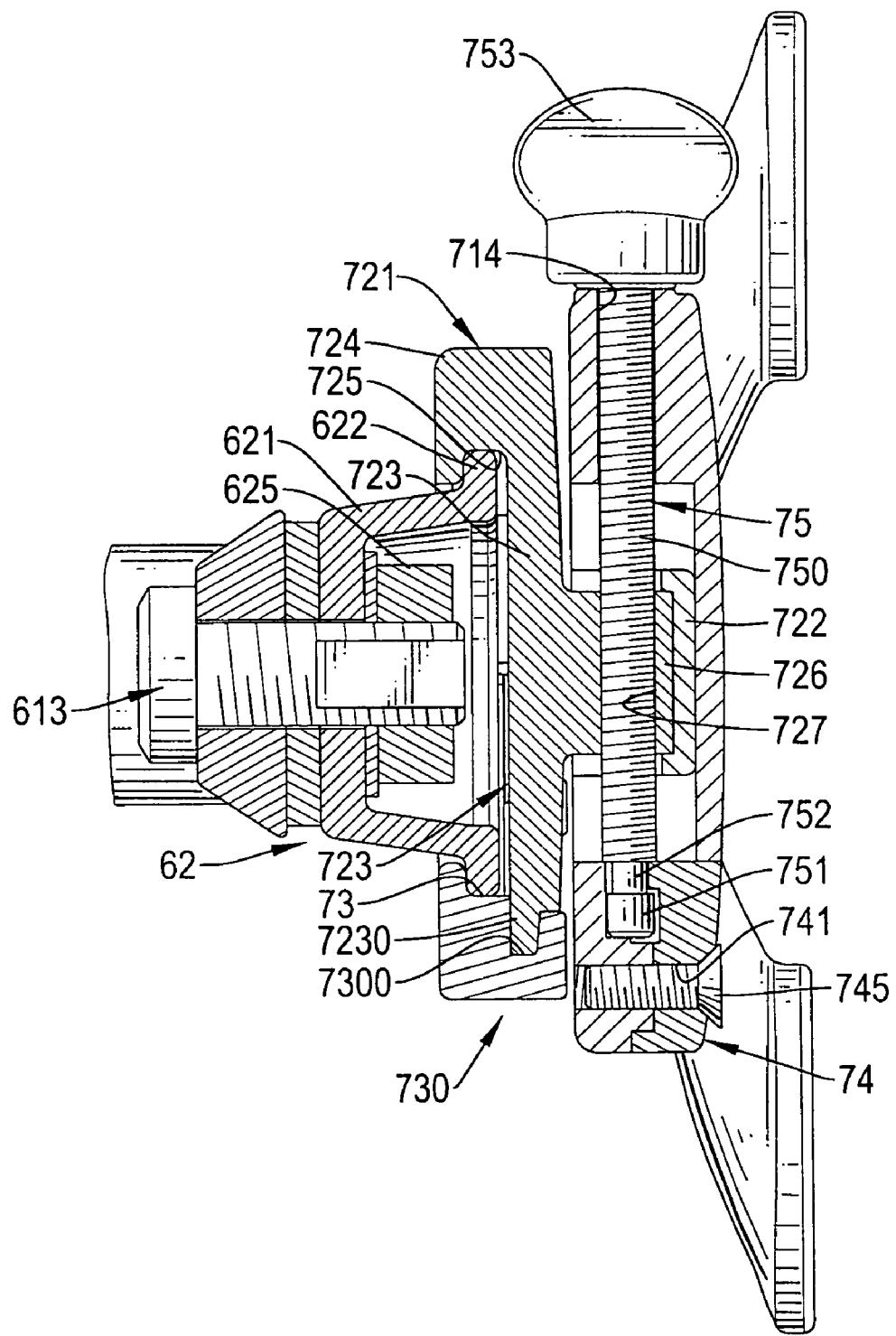
FIG. 8 is an enlarged side view in partial section of the mounting device in FIG. 7.
Figure 9:
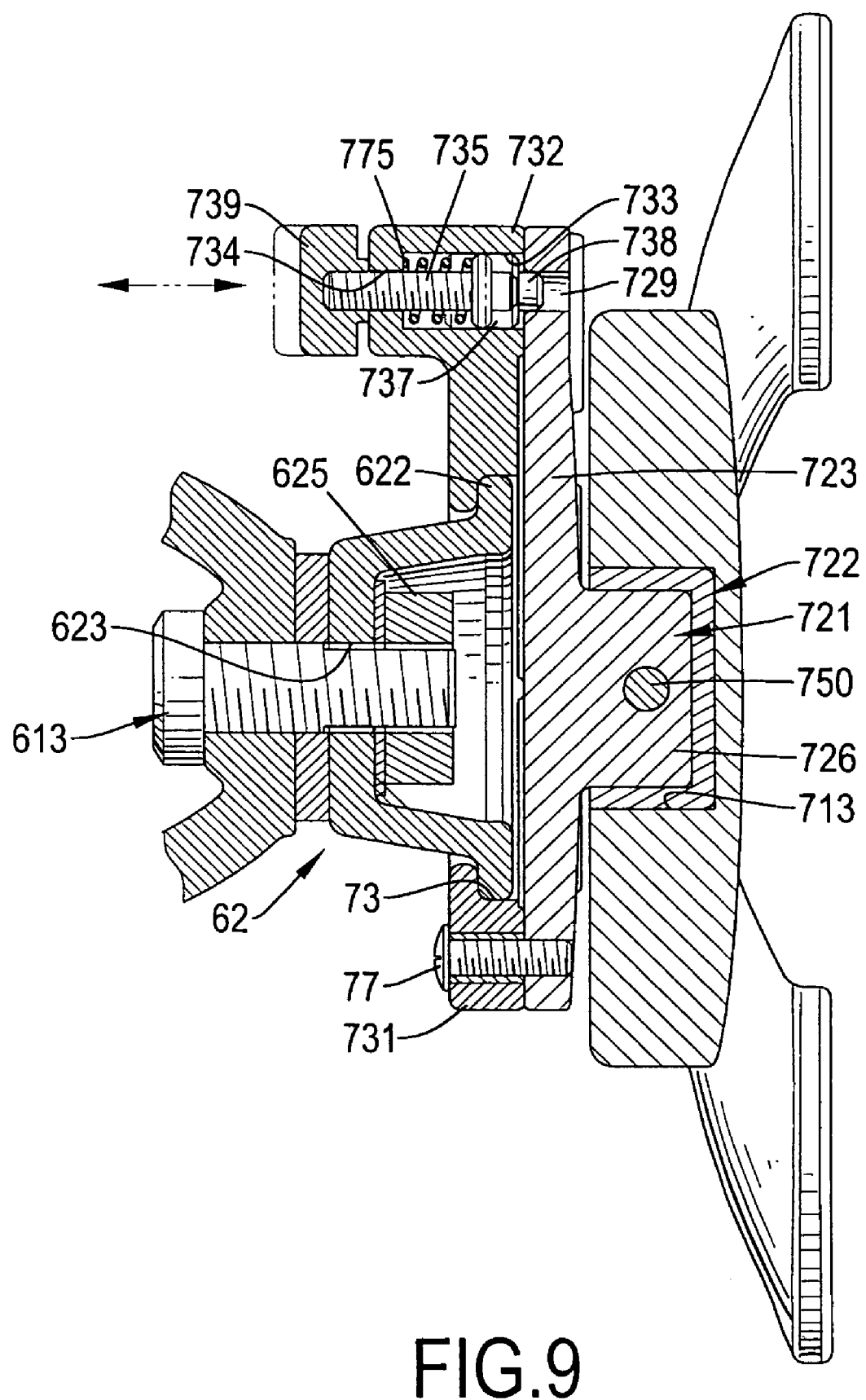
FIG. 9 is an enlarged top view in partial section of the mounting device in FIG. 7.

With further reference to FIGS. 7 to 9, the mounting device (6) is connected pivotally to the distal end (52) of the extending arm (50), connects to the back of a monitor (80) and has a mounting assembly (60) and an adjusting assembly (70).

The mounting assembly (60) is connected to the extending arm (50) and has a pivoting connector (61) and an axial connector (62).

The pivoting connector (61) is connected pivotally to the distal end (52) of the extending arm (50) and has a body and a bolt The bolt is connected to and protrudes from the body and has a threaded shaft and at least one optional key surface (613). The key surface (613) is formed longitudinally on the threaded shaft.

The axial connector (62) is connected to the pivoting connector (61) and has a cup connector (621) and a nut (625). The cup connector (621) has a closed proximal end, a sidewall, a distal edge, a flange (622) and a through hole (623). The flange (622) is formed on and extends out from the distal edge. The through hole (623) is formed coaxially through the closed proximal end, is mounted around the bolt of the pivoting connector (61) and may be keyed to correspond to the key surface (613) on the threaded shaft of the bolt to keep the cup connector (621) from rotating on the bolt or the pivoting connector (61). The nut (625) screws onto the threaded shaft of the bolt of the pivoting connector (61) to securely hold the cup connector (621) on the pivoting connector (61).

The adjusting assembly (70) is connected to the mounting assembly (60) and has an adjusting device (72) and a monitor connector (71).

The adjusting device (72) is connected to the axial connector (62) and has an adjustment seat (721) and a locking arm (730).

The adjustment seat (721) is mounted on the axial connector (62) and has a front surface, a rear surface, a bottom edge, a top edge, a locking edge, a pivot edge, an optional lip (7230), a fixed connector (724), an optional driving block (726), an optional bushing (722) and a locking tab.

The lip (7230) is formed at the bottom edge of the adjustment seat (721) and is flush with the rear surface.

The fixed connector (724) is semicircular, is formed on and protrudes from the rear surface of the adjustment seat (721) at the top edge, engages and holds the flange (622) on the axial connector (62) and has a flange recess (725) and an optional connecting notch (720). The flange recess (725) is formed in the fixed connector (724), is open toward the bottom edge of the adjustment seat (721) and engages and holds the flange (622) on the cup connector (621) of the axial connector (62). The connecting notch (720) is formed in the proximal end of the fixed connector (724) between the locking edge of the adjustment seat (721) and the flange recess (725).

The driving block (726) is formed on the protrudes from the front surface of the adjustment seat (721) and has a top, a bottom and a threaded hole (727). The threaded hole (727) is formed through the driving block (726) from the top to the bottom.

The bushing (722) is mounted around the driving block (726), keeps the driving block (726) from wearing and has an inner opening, an upper notch and a lower notch. The inner opening is mounted around the driving block (726), abuts the front surface of the adjustment seat (721) and has an upper edge and a lower edge. The upper notch is formed in the upper edge of the inner opening and corresponds to and communicates with the threaded hole (727) in the driving block (726). The lower notch is formed in the lower edge of the inner opening and corresponds to and communicates with the threaded hole (727) in the driving block (726).

Figure 10:
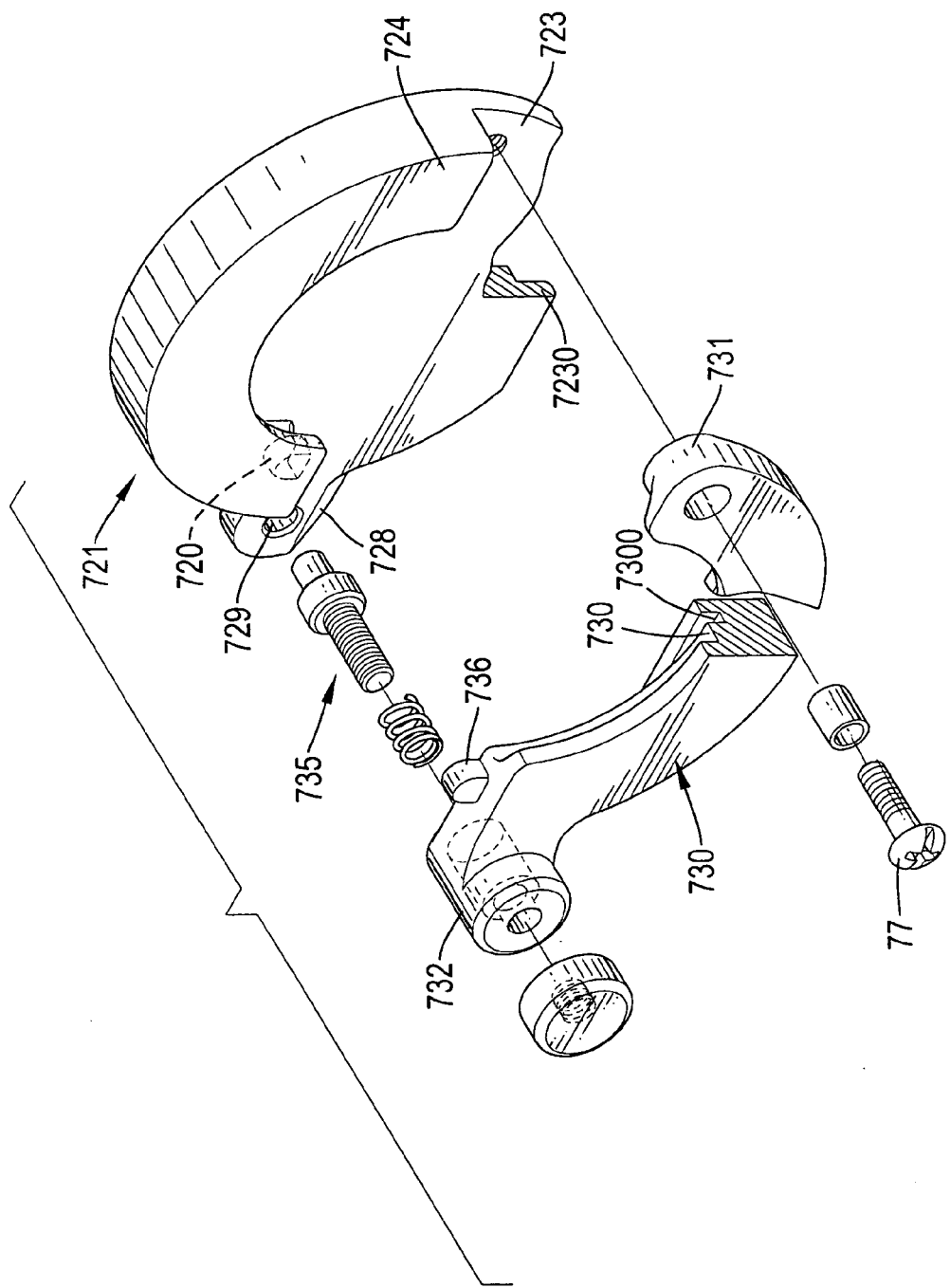
FIG. 10 is an enlarged exploded perspective view in partial section of an adjusting assembly in the mounting device in FIG. 7.

With further reference to FIG. 10, the locking tab protrudes from the adjustment seat (721) and has a lower edge, a rear surface, a front surface, an optional inclined surface (728) and a locking hole (729). The rear surface is flush with the rear surface of the adjustment seat (721). The inclined surface (728) is formed on the lower edge of the locking tab and corresponds to the rear surface of the locking tab. The locking hole (729) is formed through the locking tab from the rear surface to the front surface.

Figure 11:
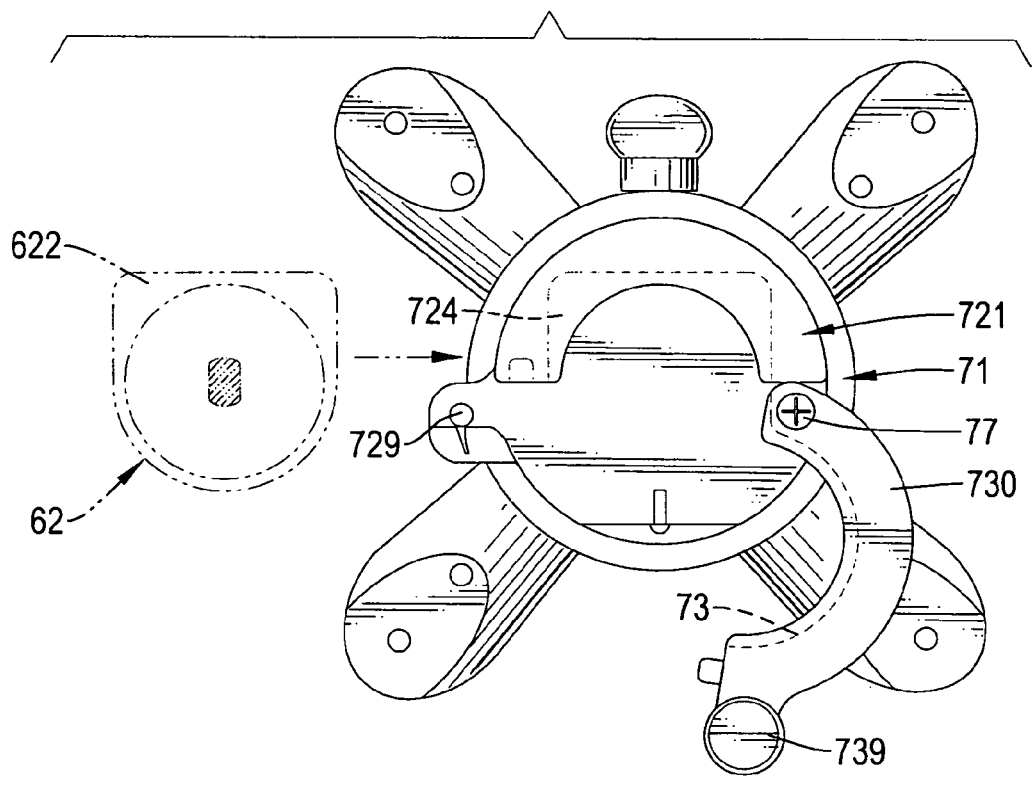
FIG. 11 is an operational front view of the mounting device in FIG. 7.
Figure 11:
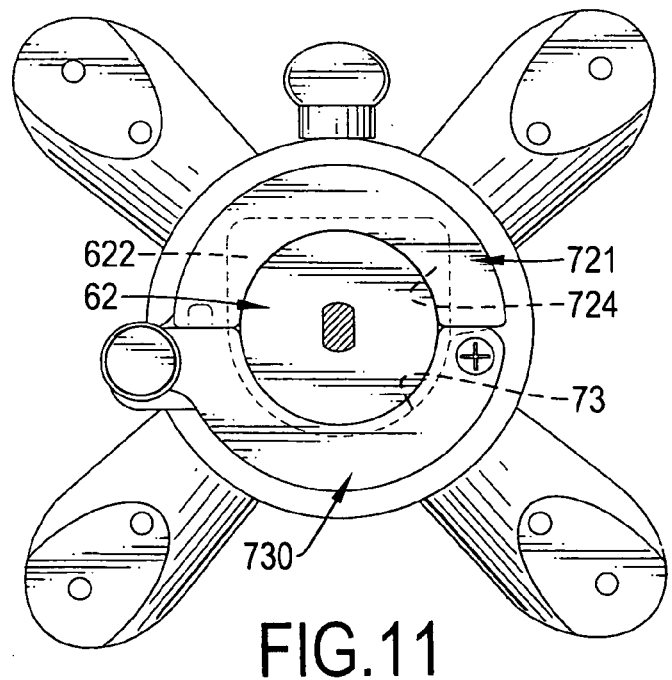

With further reference to FIG. 11, the locking arm (730) is connected pivotally to the adjustment seat (721), engages the flange (622) of the axial connector (62) and has a front surface, a rear surface, a pivotal end (731), a fastener (77), a locking end (732), a latch pin (735), an optional connecting tab (736), a flange recess (73) and an optional connecting groove (7300).

The pivotal end (731) of the locking arm (730) is connected pivotally to the adjustment seat (721) near the locking edge of the adjustment seat (721) and the fixed connector (724) and has a through hole.

The fastener (77) extends through the through hole in the pivotal end (731), attaches securely to the adjustment seat (721) and connects the pivotal end (731) pivotally to the adjustment seat (721).

The locking end (732) of the locking arm (730) selectively aligns with and attaches to the locking tab on the adjustment seat (721) and has an optional blind hole (733) and an optional through hole (734). The blind hole (733) is formed in the front surface of the locking arm (730), selectively aligns and communicates with the locking hole (729) in the locking tab of the adjustment seat (721) and has a closed end. The through hole (734) is formed through the rear surface of the locking arm (730) and the closed end of the blind hole (733) coaxially with the blind hole (733) and communicates with the blind hole (733).

The latch pin (735) is mounted slidably in the locking end (732) of the locking arm (730), may be mounted slidably in a blind hole (733) and a through hole (734), is pressed inward by the inclined surface (728) on the locking tab when the pivot arm (730) pivots to a closed position, engages the locking hole (729) in the locking tab to hold the locking arm (730) in position on the adjustment seat (721) and the cup connector (621) against the adjustment seat (721) and has a front end, a rear end, an optional protruding head (738), an optional flange (737), a spring (775) and an optional cap (739).

The front end of the latch pin (735) selectively aligns with and engages the locking hole (729) in the locking tab.

In one implementation, the rear end of the latch pin (735) protrudes from the through hole (734).

The protruding head (738) is formed on and protrudes longitudinally from the front end of the latch pin (735) and selectively aligns with and engages the locking hole (729) and has a proximal end.

The flange (737) is formed on and extends radially out from the latch pin (735) at the proximal end of the protruding head (738) and is slidably mounted in the blind hole (733).

The spring (775) is mounted around the latch pin (735) and in one implementation is mounted around the latch pin (735) in the blind hole (733) between the flange (737) and the closed end of the blind hole (733).

The cap (739) is connected to the rear end of the latch pin (735) and disengages the front end of the latch pin (735) from the locking hole (729) when the cap (739) is pulled so the locking arm (730) can be pivoted to remove the adjusting device (72) can be removed from the mounting assembly (60).

The connecting tab (736) is formed on and protrudes up from the locking arm (730) near the locking end (732) and aligns with and engages the connecting notch (720) in the fixed connector (724) when the locking end (732) of the locking arm (730) is connected to the adjustment seat (721).

The flange recess (73) is formed in the locking arm (730) from the locking end (732) to the pivotal end (731), corresponds to the flange recess (725) in the fixed connector (724) of the adjustment seat (721) and selectively connects to the flange (622) on the cup connector (621).

The connecting groove (7300) is formed in the locking arm (730) near the flange recess (73) from the locking end (732) to the pivotal end (731) and connects to the lip (7230) of the adjustment seat (721).

The monitor connector (71) is connected to the adjusting device (72) and a monitor (80) and may be implemented with a center, an outer edge, a rear surface, a front surface, a recessed track (713), an anchor recess (715), a through hole (714), an anchor (74), an adjusting rod (75) and multiple feet (712).

The recessed track (713) is formed vertically in the rear surface of the monitor connector (71) at the center, slidably holds the driving block (726) and the bushing (722) and has a top and a bottom.

The anchor recess (715) is formed in the front surface of the monitor connector (71) at the bottom of the recessed track (713) and communicates with the recessed track (713).

The through hole (714) is formed radially in the monitor connector (71) from the outer edge to the top of the recessed track (713) and communicates with the recessed track (713).

The anchor (74) is mounted in the anchor recess (715) in the monitor connector (71) and has a top surface, an inner surface, a restricted semicircular recess (743), a semicircular recess (744), a through hole (741) and a fastener (745).

The inner surface of the anchor (74) abuts the monitor connector (71) in the anchor recess (715).

The restricted semicircular recess (743) is formed in the top surface and inner surface of the anchor (74), communicates with the anchor recess (715) and aligns coaxially with the through hole (714) in the monitor connector (71).

The semicircular recess (744) is formed in the inner surface of the anchor (74) coaxially below the restricted semicircular recess (743) and communicates with the restricted semicircular recess (743) and the anchor recess (715).

The through hole (741) is formed through the anchor (74) below the semicircular recess (744).

The fastener (745) holds the anchor (74) securely in the anchor recess (715), extends through the through hole (741) in the anchor (74) and connects to the monitor connector (71).

The adjusting rod (75) is mounted rotatably in the monitor connector (71) and through the bushing (722) and the driving block (726) on the adjustment seat (721), extends rotatably through the through hole (714) and the threaded hole (727) and has an outer end, an inner end, a thumb tab (753), a head (751), a neck (752) and a thread (750).

The thumb tab (753) is formed on and protrudes longitudinally from the outer end of the adjusting rod (75) and rotates against the outer edge of the monitor connector (71) at the through hole (714).

The head (751) is formed at the inner end of the adjusting rod (75) and is mounted rotatably in the semicircular recess (744) in the anchor (74) and the anchor recess (715) in the monitor connector (71) to hold the adjusting rod (75) in position.

The neck (752) is formed in the adjusting rod (75) adjacent to the head (751) and is mounted rotatably in the restricted semicircular recess (743) in the anchor (74) and the anchor recess (715) in the monitor connector (71).

The thread (750) is formed on the adjusting rod (75) between the thumb tab (753) and the neck (752), engages the threaded hole (727) in the driving block (726) and drives the monitor connector (71) up or down relative to the driving block (726) when the adjusting rod (75) is rotated. Consequently, a monitor (80) attached to the monitor connector (71) can be moved up or down.

The feet (712) are formed on and protrude out from the outer edge of the monitor connector (71) and are connected to the back of the monitor (80).

The support apparatus (1) for suspending a monitor (80) has the following advantages.

1. The bushing (722) on the driving block (726) slides in the recessed track (713) in the monitor connector (71), keeps the driving block (726) from wearing down and reduces noise generated when the support apparatus (1) is adjusted to change the position of the monitor (80).
2. The monitor (80) power cord can be stored inside the covers (34) on the sidewalls of the lower arm (32) easily and conventionally.
3. The monitor (80) can be removed quickly and easily from the support apparatus (1), can be attached quickly and easily to another support apparatus (1) or can be quickly and easily replaced by simply pulling the cap (739) on the latch pin (735) to release the locking arm (730) from the locking hole (729) and pivoting the locking arm (730) the adjusting assembly (70) can be removed from the mounting assembly (60).
4. The monitor (80) is adjusted by simply turning the thumb tab (753) to rotate the adjusting rod (75) and move the monitor connector (71) on the driving block (726) and the bushing (722).

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A support apparatus for suspending a monitor having a power cord and a back, and the support apparatus comprising a mounting seat having a distal end;

a support arm assembly being connected to the distal end of the mounting seat and having a proximal bracket being connected rotatably to distal end of the mounting seat and having a top;

a bottom;

an external surface;

a chamber being defined in the proximal bracket and having an opening;

an inner surface;

a top;

a bottom;

an inner recess being formed in the inner surface of the chamber and having a shoulder being defined adjacent to the bottom and having two ends;

multiple pinholes being formed through the external surface of the proximal bracket in aligned pairs and communicating transversely with the chamber; and two pivots being mounted respectively in the pinholes in the chamber; and a through hole being formed through the top of the proximal bracket near the inner recess and communicating with the chamber;

a positioning device being connected to the proximal bracket and having an adjusting bolt being mounted through the through hole in the proximal bracket, extending into the chamber, being threaded and having an outer end;

an inner end pressing against the shoulder on the inner recess;

a head being formed on the outer end and being mounted rotatably in the through hole in the top of the proximal bracket; and a mounting flange being formed on and protruding out from the adjusting bolt adjacent to the head and being mounted slidably inside and against the top of the proximal bracket adjacent to the through hole;

a sliding bracket being driven by the adjusting bolt between the pivots and having a body being mounted slidably in the chamber of the proximal bracket and having a top;

a bottom;

a rear side slidably abutting the inner recess in the proximal bracket; and a front side;

a threaded hole being formed through the body from the top to the bottom and being screwed onto and driven by the adjusting bolt;

two parallel ears being formed on the front side of the body and protruding toward the opening in the chamber, and each parallel ear having a pinhole, and the pinholes in the parallel ears aligning with each other; and a pivot pin being mounted in the pinholes in the parallel ears; and an alignment bracket being mounted against the shoulder in the chamber in the proximal bracket and holding the inner end in position;

an upper arm being connected pivotally to the proximal bracket and having a proximal end being connected pivotally to the proximal bracket by one of the pivots extending through the proximal end; and a distal end;

a lower arm being connected pivotally to the proximal bracket and having a proximal end being connected pivotally to the proximal bracket by the other pivot extending through the proximal end; and a front end;

a loading element being connected to positioning device and having a proximal end being mounted pivotally on the pivot pin between the parallel ears of the sliding bracket; and a distal end; and a distal bracket being connected pivotally to the distal ends of the upper arm, the loading element and the front end of the lower arm and having a mounting recess defined vertically in the distal bracket;

an extending arm being connected to the distal bracket and having a proximal end being mounted pivotally in the mounting recess in the distal bracket; and a distal end; and a mounting device being connected pivotally to the distal end of the extending arm, connecting to the back of a monitor and having a mounting assembly being connected to the extending arm and having a pivoting connector being connected to the distal end of the extending arm and having a body; and a bolt being connected to and protruding from the body and having a threaded shaft; and an axial connector being connected to the pivoting connector and having a cup connector having a closed proximal end;

a sidewall;

a distal edge;

a flange being formed on and extending out from the distal edge; and a through hole being formed coaxially through the closed proximal end being mounted around the bolt of the pivoting connector; and a nut screwing onto the threaded shaft of the bolt of the pivoting connector; and an adjusting assembly being connected to the mounting assembly and having an adjusting device being connected to the axial connector and having an adjustment seat being mounted on the axial connector and having a front surface;

a rear surface;

a bottom edge;

a top edge;

a locking edge;

a pivot edge;

a fixed connector being semicircular, being formed on and protruding from the rear surface of the adjustment seat at the top edge, engaging and holding the flange on the axial connector and having a flange recess being formed in the fixed connector, being open toward the bottom edge of the adjustment seat and engaging and holding the flange on the cup connector of the axial connector; and a locking tab protruding from the adjustment seat and having
a lower edge;
a rear surface being flush with the rear surface of the adjustment seat;
a front surface; and
a locking hole being formed through the locking tab from the rear surface to the front surface; and a locking arm being connected pivotally to the adjustment seat, engaging the flange of the axial connector and having
a pivotal end being connected pivotally to the adjustment seat near the locking edge of the adjustment seat and the fixed connector and having a through hole;
a fastener extending through the through hole in the pivotal end, attaching securely to the adjustment seat and connecting the pivotal end pivotally to the adjustment seat;
a locking end selectively aligning with and attaching to the locking tab on the adjustment seat;
a latch pin being mounted slidably in the locking end of the locking arm, engaging the locking hole in the locking tab and having
a front end selectively aligning with and engaging the locking hole in the locking tab;
a rear end; and
a spring mounted around the latch pin; and
a flange recess being formed in the locking arm from the locking end to the pivotal end, corresponding to the flange recess in the fixed connector of the adjustment seat and selectively connecting to the flange on the cup connector; and a monitor connector being connected to the adjusting device and the monitor.

2. The support apparatus for suspending a monitor as claimed in claim 1, wherein
the mounting seat further has
a mounting recess being defined axially in the distal end of the mounting seat; and
a setscrew hole being formed radially into the mounting seat and communicating with the mounting recess; and
the proximal bracket further has
a mounting post being formed on and protruding down from the bottom of the proximal bracket, being mounted in the mounting recess in the mounting seat and having
a distal end;
an outer surface; and
an annular groove being formed in the outer surface of the mounting post near the distal end and aligning with the setscrew hole in the mounting seat; and a setscrew screwing into the setscrew hole, extending into the mounting recess and the annular groove and pressing against the annular groove.

3. The support apparatus for suspending a monitor as claimed in claim 1, wherein
the shoulder of the inner recess in the chamber further has
two protrusions being formed respectively on and protruding from the ends of the shoulder toward the opening; and
two mounting holes being coaxially formed respectively in the protrusions;
the inner end of the adjusting bolt is hemispheric; and
the alignment bracket further has
a foot being mounted on the bottom of the chamber against the shoulder and having
an upper surface;
an outer edge; and
two grooves being formed in the upper surface of the foot and corresponding respectively to engaging the protrusions on the shoulder;
a lip being formed on and protruding up from the upper surface of the foot at the outer edge and having
an inner surface;
a middle;
a curved notch being formed vertically in the inner surface at the middle of the lip and holding the inner end of the adjusting bolt against the shoulder; and
two through holes being formed through the lip and aligning and communicating respectively with the mounting holes in the protrusions; and
two screws extending respectively through the through holes in the lip and screwing respectively into the mounting holes in the protrusions.

4. The support apparatus for suspending a monitor as claimed in claim 1, wherein
the positioning device further has
a cap being mounted in the chamber through the opening, being connected to the proximal bracket and having
two sidewalls, each sidewall having an inner edge;
multiple pivot notches being formed in the sidewalls of the cap and being mounted around the pivots in the chamber; and
an outer opening being formed through the cap and communicating with the open end of the chamber.

5. The support apparatus for suspending a monitor as claimed in claim 1, wherein
the lower arm further has
two sidewalls;
multiple connecting ears being formed in the sidewalls of the lower arm, and each connecting ear having
a retaining block protruding up from the connecting ear opposite to the corresponding sidewall of the lower arm; and
a through hole being formed through the connecting ear; and
two covers being semicylindrical, holding the power cord of the monitor and being mounted pivotally on the lower arm, and each cover having
a hinge barrel being formed on the cover, being mounted pivotally between the connecting ears and having
a lower end;
an upper end;

a through hole being formed coaxially through the hinge barrel, communicating with the through holes in the corresponding connecting ears; and a notch being formed in the lower end of the hinge barrel and selectively engaging the retaining block in the corresponding connecting ear;

a pivot pin extending respectively through the through holes in the hinge barrels, protruding from the upper and lower ends and extending into the through holes in the corresponding connecting ears; and a spring being mounted around the pivot pin between the upper end of the hinge barrel and the corresponding connecting ears and pushing the hinge barrel to cause the notch to engage the corresponding retaining block.

6. The support apparatus for suspending a monitor as claimed in claim 1, wherein the bolt connected to and protruding from the body of the pivoting connector further has at least one key surface formed longitudinally on the threaded shaft; and the through hole in the cup connector is keyed to correspond to the at least one key surface on the threaded shaft of the bolt.

7. The support apparatus for suspending a monitor as claimed in claim 1, wherein the locking end of the locking arm further has a blind hole being formed in the front surface of the locking arm, and selectively aligning and communicating with the locking hole in the locking tab in the adjustment seat and having a closed end; and a through hole being formed through the rear surface of the locking arm and the closed end of the blind hole exoacilly with the blind hole and communicating with the blind hole;

the latch pin is slidably mounted in the blind hole and the through hole, the rear end protrudes from the through hole, and the latch pin further has a protruding head being formed on and protruding longitudinally from the front end of the latch pin and selectively aligning with and engaging the locking hole and having a proximal end;

a flange being formed on and extending radially out from the latch pin at the proximal end of the protruded head and being slidably mounted in the blind hole; and a cap being connected to the rear end of the latch pin; and the spring of the latch pin is mounted around the latch pin in the blind hole between the flange and the closed end of the blind hole.

8. The support apparatus for suspending a monitor as claimed in claim 1, wherein the adjustment seat further has a lip being formed at the bottom edge of the adjustment seat and being flush with the rear surface; and the locking arm further has a connecting groove being formed in the locking arm near the flange recess from the locking end to the pivotal end and connecting to the lip of the adjustment seat.

9. The support apparatus for suspending a monitor as claimed in claim 1, wherein the fixed connector further has a connecting notch being formed in the proximal end of the fixed connector between the locking edge of the adjustment seat and the flange recess;

the locking tab on the adjustment seat further has an inclined surface being formed on the on the lower edge of the locking tab and corresponds to the rear surface of the locking tab; and the locking arm further has a connecting tab being formed on and protruding up from the locking arm near the locking end and aligning with and engaging the connecting notch in the fixed connector when the locking end of the locking arm is connected to the adjustment seat.

10. The support apparatus for suspending a monitor as claimed in claim 1, wherein the adjusting device further has a driving block being formed on and protruding from the front surface of the adjustment seat and having a top;

a bottom; and a threaded hole being formed through the driving block from the top to the bottom; and a bushing being mounted around the driving block and having an inner opening being mounted around the driving block, abutting the front surface of the adjustment seat and having an upper edge; and a lower edge;

an upper notch being formed in the upper edge of the inner opening and corresponding to and communicating with the threaded hole in the driving block; and a lower notch being formed in the lower edge of the inner opening and corresponding to and communicating with the treaded hole in the driving block; and the monitor connector has a center;

an outer edge;

a rear surface;

a front surface;

a recessed track being formed vertically in the rear surface of the monitor connector at the center, slidably holding the driving block and the bushing and having a top; and a bottom;

an anchor recess being formed in the front surface of the monitor connector at the bottom of the recessed track and communicating with the recessed track;

a through hole being formed radially in the monitor connector from the outer edge to the top of the recessed track and communicating with the recessed track;

an anchor being mounted in the anchor recess in the monitor connector and having a top surface;

an inner surface abutting the monitor connector in the anchor recess;

a restricted semicircular recess being formed in the top surface and inner surface of the anchor, communicating with the anchor recess and aligning coaxially with the through hole in the monitor connector;

a semicircular recess being formed in the inner surface of the anchor coaxially below the restricted semicircular recess and communicating with the restricted semicircular recess and the anchor recess;

a through hole being formed through the anchor below the semicircular recess; and a fastener holding the anchor securely in the anchor recess, extending through the through hole in the anchor and connecting to the monitor connector;

an adjusting rod being mounted rotatably in the monitor connector and through the bushing and the driving block on the adjustment seat, extending rotatably through the through hole and the threaded hole and having an outer end;

an inner end;

a thumb tab being formed on and providing longitudinally from the outer end of the adjusting rod and rotating against the outer edge of the monitor connector at the through hole;

a head being formed at the inner end of the adjusting rod and being mounted rotatably in the semicircular recess in the anchor and the anchor recess in the monitor connector to hold the adjusting rod in position;

a neck being formed in the adjusting rod adjacent to the head and being mounted rotatably in the restricted semicircular recess in the anchor and the anchor recess in the monitor connector;

a thread being formed on the adjusting rod between the thumb tab and the neck, engaging the threaded hole in the driving block and driving the monitor connector up or down relative to the driving block when the adjusting rod is rotated; and multiple feet being formed on and protruding out from the outer edge of the monitor connector and connecting to the back of the monitor.

* * * * *